United States Patent Office 3,518,873
Patented July 7, 1970

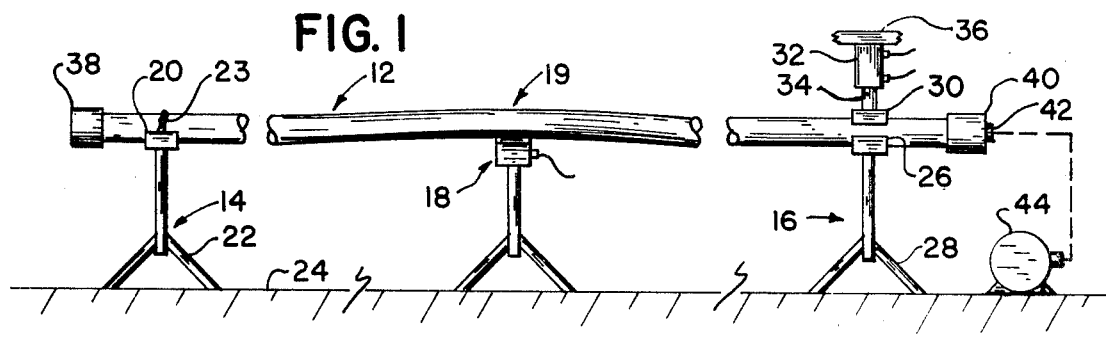
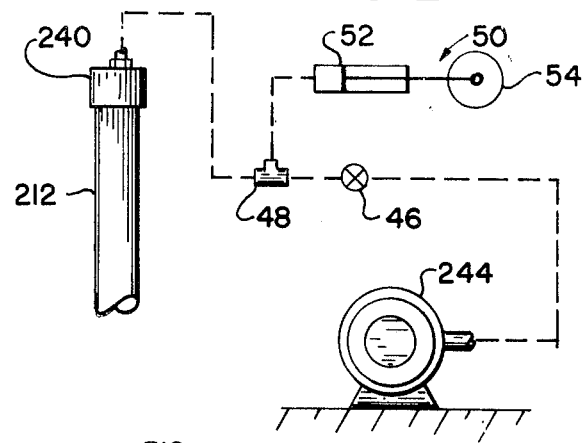
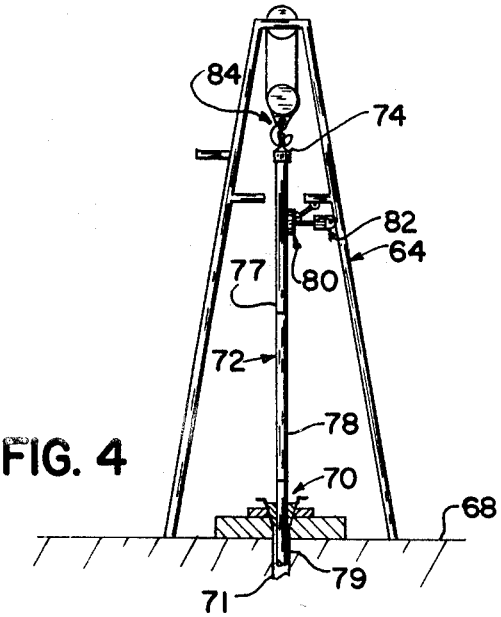
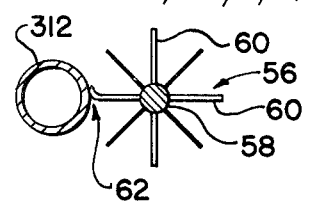
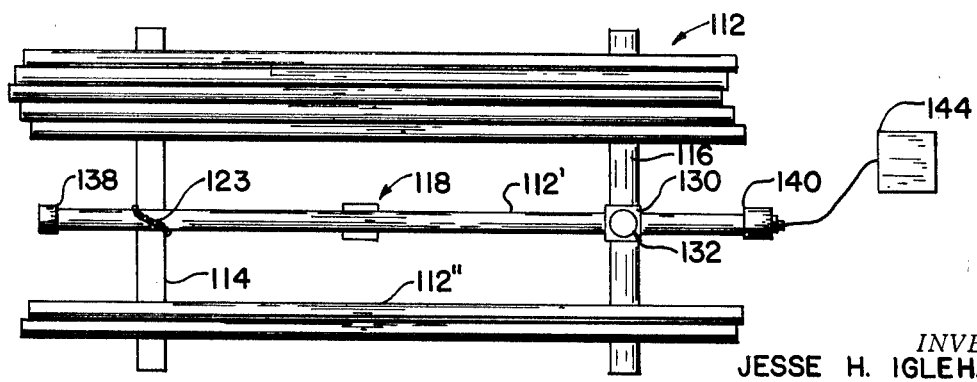

---

3,518,873
METHOD OF TESTING PIPE
Jesse H. Iglehart and Hilary H. Iglehart, both of
4958 Andrews Highway, Odessa, Tex. 79760
Filed Feb. 2, 1968, Ser. No. 702,589
Int. Cl. G01m 3/24, 7/00
U.S. Cl. 73—49.5    3 Claims

ABSTRACT OF THE DISCLOSURE

A method of testing pipe and the like by utilizing both hydrostatic pressure and vibrational energy. The pipe is connected to a suitable source of pressurized fluid which increases the internal pressure of the pipe to a predetermined value. While holding the pressure within the pipe constant, the pipe is subjected to vibrational energy which may extend over a considerable range of frequencies. The vibrational energy causes any hidden defects within the pipe to fail, due to the work which is performed upon the pipe by the vibrational energy in proximity of the defect. The source of vibrational energy may be induced into the fluid contained within the pipe or into the pipe wall structure itself, such as exemplified by application of a mechanical vibrator adjacent the outer peripheral surface of the pipe being tested.

BACKGROUND OF THE INVENTION

In the oil industry, failure of pipe is often a costly occurrence because of the inaccessibility of the pipe as well as the expense involved in effecting a repair. Furthermore, where the pipe is in the form of a transmission line, valuable products may be lost as well as contamination of the area in the vicinity of the pipe failure. Where the failure occurs in drill pipe, a costly fishing job may be required, as well as replacement of the recovered drill pipe.

In testing pipe and other tubular goods in accordance with the prior art, the pipe is generally provided with a cap at each end thereof with one cap having a passageway therein which is flow connected to a suitable source of pressurized fluid, such as a high pressure pump. The fluid employed is usually water. The opposite cap is provided with a valve to enable displacement of air therefrom. When the pipe is completely filled with water, the outlet valve is closed and the pipe subjected to a predetermined pressure which is usually determined by consulting tables showing the allowable working pressure for the particular pipe being tested. After subjecting the pipe to this predetermined pressure, the pressure source is disconnected from the pipe, the water drained therefrom, the caps removed from each end of the pipe, whereupon the pipe is then cleaned, stored, and pronounced suitable for future use. Should the pipe burst or should leakage occur along its longitudinal length, the pipe is discarded.

Some time a pipe will test satisfactorily, and after being placed into service a defect will soon appear in the pipe. Where the pipe is subjected to extremely high pressure, this defect may occur as a pin hole that emits a high pressure jet of fluid which is dangerous should one come into contact with it. Other times the failure may occur as a rupture whereupon the pipe is split along the entire longitudinal wall thereof. Failure of used pipe has caused some segments of industry to minimize the use thereof.

All pipe has a maximum allowable working pressure, which, if exceeded sufficiently, will result in failure thereof. Therefore, there is an area or a location in every pipe which exhibits a minimum strength with respect to the remainder of the pipe. Should this location of minimum strength exceed the maximum allowable working pressure of the pipe, the pipe generally remains in service until this area is further eroded or reduced in strength to where its strength equals the working pressure, whereupon the pipe ruptures. Some time this area of minimum strength is near or equal to the testing pressure to which the pipe is subjected. This defect often goes unnoticed during conventional testing either because of its size or because scale or other debris precludes observation of leakage during the hydrostatic test. When the pipe is later subjected to usage, the forces induced therein resulting from usage or stresses due to mechanical vibration or temperature changes causes this defect to cause rupture of the pipe.

SUMMARY OF THE INVENTION

The present invention includes a method of testing pipe by applying a source of pressurized fluid internally thereof with the pressure being proportional to the designed or recommended maximum allowable working pressure for the particular pipe being tested. While holding the pressure constant, the pipe is subjected to a source of vibrational energy which may cover a substantial frequency range. Should the pipe exhibit a leak or should the pipe rupture, it is discarded as being unsuitable for further use.

It is therefore an object of the present invention to provide a method of detecting defects in pipes and other tubular goods.

Another object of the present invention is the provision of a method of hydrostatically testing pipe wherein the pipe is subjected to vibrational energy.

A still further object of the present invention is to provide a method of testing pipe wherein the weakest portion of the pipe may be ascertained.

A still further object of the present invention is the provision of a method of testing pipe whereby the pipe is subjected to vibrational impulses in order to simulate conditions of usage which the pipe may later encounter.

Another object of the present invention is the provision of a method of testing pipe while the pipe is suspended with one depending end thereof located within a bore hole.

Another object of the present invention is a method of testing pipe by utilizing both hydrostatic pressure and vibrational energy of a predetermined frequency.

The above objects are attained in accordance with the present invention by subjecting a pipe to a number of mechanical manipulations as substantially outlined in the above abstract and summary. Other objects of the present invention will become evident to those skilled in the art as the remainder of this disclosure is digested.

BRIEF DESCRIPTION OF THE DRAWINGS

FIG. 1 is a schematic side elevational view illustrating one embodiment by which the method of the present invention may be practiced;

FIG. 2 is a partly schematical partly diagrammatical presentation of another embodiment of the present invention;

FIG. 3 is a fragmentary cross-sectional representation of still another embodiment of the present invention;

FIG. 4 is a schematical side elevational representation of still another embodiment of the present invention; and FIG. 5 is a top plan view similar to the illustration of FIG. 1.

DESCRIPTION OF THE PREFERRED EMBODIMENTS

Referring now to the drawings, wherein like reference characters designate identical or corresponding parts throughout the several views, and more particularly to FIG. 1, wherein a schematic arrangement of the apparatus is shown in which the numeral 12 indicates a pipe which is being tested. While the term pipe is used throughout the specification in order to illustrate the various embodiments of the invention, this term is intended to include tubular and tubular like goods which may be tested in accordance with the present method and including drill pipe, drill stems, casing, production pipe, as well as any other vessel, housing, or enclosure which is susceptible to testing by the present method.

The pipe 12 is suitably supported by first and second support members 14 and 16, respectively, with the center of the pipe having a substantial portion of the weight thereof resting upon a centrally located member 18. The last named member forms a means for inducing vibrational energy into the wall of the pipe. Member 18 produces a slight bow into the pipe in a manner as indicated by the arrow at numeral 19. The first support member includes a saddle 20 and spaced apart legs 22 which radiate from the bottommost portion thereof. A chain 23 rigidly holds the pipe removably secured within the saddle. Numeral 24 indicates a suitable supporting surface, such as the ground. The second support member similarly includes a saddle 26 and legs 28.

Oppositely disposed with respect to saddle 26 is a complimentary saddle arrangement 30 suitably connected to a hydraulic cylinder 32 having a piston 34 reciprocatingly received therein for vertically moving the saddle 30. Cylinder 32 is rigidly affixed to an overhead support member 36. Support member 36 is suitably secured to the second support member by any convenient structural means (not shown).

Caps 38 and 40 are threadedly secured to each depending end of the pipe and are provided with valves (not shown) in the usual manner. Cap 40 is reduced to a nipple 42 which is flow connected to a source of high pressure fluid at 44, which may be in the form of a conventional high pressure pump.

Looking now to the embodiment of FIG. 2 wherein there is seen the depending end of a pipe 212 having a cap 240 threadedly secured thereto which in turn is connected to T 48. T 48 is connected to high pressure pump 244 through valve 46; and to a means 50 which produces vibrational energy into the fluid which flows into the pipe. Means 50 is illustrated as being in the form of a high speed reciprocatory type pump having eccentric 54 which reciprocates the piston seen located within cylinder 52.

FIG. 3 diagrammatically sets forth a cross-sectional view of a pipe 312 which is positioned adjacent to a mechanical vibrator 56. The mechanical vibrator is illustrated as being in the form of a rotatable shaft 58 having resilient arms 60 radiating therefrom. The arrow at numeral 62 illustrates the configuration assumed by one of the rotating arms as it contacts the outside peripheral wall surface of the pipe.

FIG. 4 illustrates an embodiment of the invention wherein the present method is practiced with the pipe being vertically suspended within a drilling derrick or workover unit 64. The derrick is supported from the ground 68 in the usual manner and includes a set of slips 70 set in a conventional bowl, the details of which are known to those skilled in the art. Bore hole 71 receives either drill pipe or stands of production pipe 72 with the drill string being supportingly attached to a connector 74. The stand of pipe is comprised of individual pipe joints 77, 78, and 79, with the last joint illustrated as being suspended within the bore hole by the slips. Member 80 generally corresponds to member 18 of FIG. 1 which provides a suitable source of vibrational energy. The vibrating member is attached to a hydraulic cylinder 82 which retracts the vibrating member away from the pipe and out of the way of the traveling block 84 when it is not in use. The traveling block moves the pipe into and out of the bore hole in the usual manner.

Looking now to the details of FIG. 5 wherein there is seen a multiplicity of pipes 112 suitably supported by support means 114 and 116. Pipes 112 have not been tested, pipe 112' is in the process of being tested, while pipes 112" have already been tested. The member for producing vibrational energy is generally illustrated by the arrow at numeral 118 and may be one of many different means for producing vibrational motion. One end of the pipe which is being tested is removably secured to the support member by a chain 123 while the second support member has the pipe removably secured thereto by means of the saddle 130 which is hydraulically actuated by cylinder 132, all in a manner similar to the illustration of FIG. 1. Caps 138, 140 maintain the pipe in communication with a source of hydrostatic pressure 144.

OPERATION

In practicing the method of the present invention, in accordance with the embodiment of FIG. 1, the pipe preferably slopes toward cap 40 while cap 38 is provided with an automatically actuated valve which enables flow of compressible fluid therethrough while precluding the flow of liquid, all in a manner as is known to those skilled in the art. With the pipe secured to the first support member by means of the chain and with the remaining support member having the pipe rigidly secured thereto by means of the complementary saddles 26 and 30, the source of hydrostatic pressure 44 is energized to provide a predetermined pressure which is generally the allowable working pressure of the pipe. Member 18 is brought into intimate contact with the outer peripheral wall surface of the pipe and energized to induce vibrational energy into the wall of the pipe.

The specific source of vibration at 18 is preferably a ball type air operated vibrator (Martin Engineering Co., Neponset, Ill. 61345; Model No. UCVR-4-05) which is provided with a source of air pressure which ranges from zero to 80 p.s.i. in order to impart the wall of the pipe with a wide range of vibrational frequencies. With the vibrator member positioned in the illustrated manner of FIG. 1, a bow as seen at 19 is formed in the pipe, thereby assuring proper contact between the pipe and vibrator. The action of the vibrator produces various frequencies within the pipe. The length of the pipe as well as the wall thickness and fluid pressure therewithin sets up various frequencies of vibration which causes a range of harmonics to be induced within the pipe, thereby inducing work or energy into the wall of the pipe. It is believed that a flaw or defect in the pipe, such as a minute crack, will cause discontinuous edge portions of the defect to undergo extreme work, that is, relative motion with respect to each other, thereby further enlarging the defect sufficiently to be evidenced as leakage of water therefrom. Under high pressure applications the pipe may actually rupture along its entire longitudinal surface.

After testing the pipe in this manner, saddle 30 is lifted vertically upward and chain 23 unfastened, while the liquid is being drained from the pipe. The pipe is then placed in a pipe rack since it is considered acceptable for further use. Where deemed desirable, the inside of the pipe can be flushed with clean water to remove the debris which has been loosened during the testing operation.

In carrying out the present method in accordance with the embodiment of FIG. 2, the pipe 212 is positioned on suitable spaced apart support members in a manner similar to that described in conjunction with the embodiment of FIG. 1. Upon attaining a suitable predetermined internal pipe pressure by means of pressure source 244, apparatus 50 is energized. This action induces vibrational energy within the same liquid medium which is used to hydrostatically test the pipe. In the simplified illustration of FIG. 2, this expedient is accomplished by means of a high speed reciprocating cylinder and piston arrangement 52 which is driven by prime mover 54. The frequency of vibration imposed upon the fluid within the pipe is proportional to the speed of prime mover 54.

FIG. 3 illustrates another mechanical vibrator comprised of a rotatable shaft having a multiplicity of fingers radiating therefrom. Upon bringing the rotating free depending ends of the fingers into contact with the outer wall surface of the pipe, the fingers contact the pipe thereby producing vibrational energy within the wall of the pipe in proportion to the rotational speed of the shaft.

FIG. 4 illustrates the practice of the present method in conjunction with stands of drill pipe, although the stands of pipe may equally well be production tubing or casing. Assuming the pipe 72 are stands of drill pipe, it is desirable to simultaneously test several joints of pipe at one time. This is best carried out by taking advantage of prior art test methods wherein the various stands of pipe are each tested from the upper end of the derrick by utilizing a mandrel which fits within the upper terminal end of a stand of pipe and wherein the mandrel is provided with cups which are spaced apart on the mandrel with the lowermost cup sealingly positioned at the lower terminal end of the stand while the uppermost cup is positioned at the uppermost end of the stand, thereby leaving an annulus between the inside peripheral wall of the joints of pipe to be tested and the mandrel, all in a manner known to those skilled in the art. This expedient enables each stand of pipe to be tested after it is placed into the string of pipe. In practicing the present invention, the vibrating member 80 is movably mounted by means of hydraulically retracting unit 82 which enables remote actuation of the vibrator. With the stand of pipe suspended from the traveling block in the manner illustrated in FIG. 4, hydraulic cylinder 82 moves the vibrator 80 into contact with the stand of pipe while at the same time the stand of pipe is subjected to a predetermined hydrostatic head. Upon reaching a predetermined pressure, the hydraulic cylinder is actuated whereupon the vibrator is brought into intimate contact with the outer wall surface of the pipe. Any defect in the pipe is evidenced in the form of a visible leak. After testing the stand of pipe, vibrator 80 is retracted by means of the hydraulic cylinder, whereupon the traveling block then lowers the stand of pipe into the bore-hole, after which another stand of pipe is attached thereto in the usual manner, whereupon the next stand of pipe may then be tested.

FIG. 5 is similar to the illustration of FIG. 1, but additionally shows the apparatus as it may be utilized in conjunction with a pipe rack, in order to expedite the testing method. The elongated pipe rack enables a multiplicity of pipes 112 to be tested by merely rolling each pipe into position at 112' whereupon the pipes are individually tested in accordance with the description of FIG. 1. After testing, the pipes are moved into position as seen at numeral 112".

Having now read the foregoing descriptive part of my invention, it will occur to others to use other sources of vibrational energy in carrying out the present method. For example, it is possible to use ultrasonic devices wherein the vibrational apparatus can be spaced apart from and focused onto the pipe so as to induce vibrational energy into the pipe or the liquid contained therein. Systems of this nature as well as various other means for inducing vibrational energy into a substance are treated in detail in many text books, as for example, Sonics by Huether and Bolt; John Wiley and Sons, Inc., 1962, Library of Congress Card No. 55-6388; New York.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to.

I claim:
1. A method of testing pipe including the steps of:
   (1) applying a fluid pressure to the inside of the pipe to be tested by connecting the pipe to a source of non-compressible fluid under pressure;
   (2) adjusting the pressure of the fluid contained within the pipe to a value which is less than the bursting strength of the pipe;
   (3) generating a source of vibrational energy, said vibrational energy having a frequency of at least several cycles per second; said vibrational energy being variable in frequency range;
   (4) placing said source of vibrational energy in close proximity of the pipe to thereby cause the pipe to vibrate at a frequency which is proportional to said source while at the same time maintaining the fluid pressure of step (2) on the pipe;
   (5) releasing the pressure of step (1) and removing the vibrational energy of step (4) from the pipe.
2. The method of claim 1 wherein step (3) includes: driving a mechanical vibrator by an air driven motor and varying the frequency of vibration by varying the air pressure which drives the motor.
3. The method of claim 1 wherein the vibrational energy is attained by: subjecting the outer peripheral wall surface of the pipe to mechanical vibrational energy.

References Cited

UNITED STATES PATENTS

| | | | |
|---|---|---|---|
| 1,861,684 | 6/1932 | Dague | 73—49.5 XR |
| 1,972,630 | 9/1934 | Neale et al. | 73—49.5 |
| 2,183,974 | 12/1939 | Richardson | 73—49.1 |
| 3,064,466 | 11/1962 | Liers | 73—45.5 |
| 3,102,415 | 9/1963 | Hanggi et al. | 73—37 |
| 3,196,677 | 7/1965 | Day et al. | 73—37 XR |
| 3,375,703 | 4/1968 | Phillips et al. | 73—40.5 |

LOUIS R. PRINCE, Primary Examiner

H. C. POST III, Assistant Examiner

U.S. Cl. X.R.

73—67.3